April 22, 1941.  J. P. SPANG  2,239,430
MEAT-TENDERING MACHINE
Filed Aug. 6, 1938  6 Sheets-Sheet 3

Inventor
Joseph P. Spang
by Heard Smith & Tennant
Attys.

April 22, 1941.  J. P. SPANG  2,239,430
MEAT-TENDERING MACHINE
Filed Aug. 6, 1938  6 Sheets-Sheet 5

Inventor.
Joseph P. Spang
by Heard Smith & Tennant.
Attys.

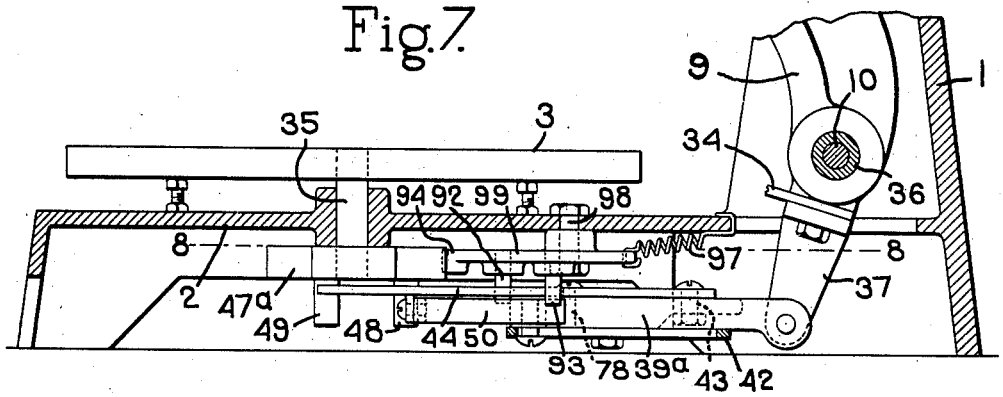

Patented Apr. 22, 1941

2,239,430

UNITED STATES PATENT OFFICE 2,239,430

MEAT-TENDERING MACHINE

Joseph P. Spang, Quincy, Mass., assignor to Cube Steak Machine Company, Inc., Boston, Mass., a corporation of Massachusetts Application August 6, 1938, Serial No. 223,440

10 Claims. (Cl. 17—25)

This invention relates to a device for tendering meat in slice form, and particularly to that type of meat-tendering apparatus which comprises a gang or bank of narrow cutting blades mounted to be moved toward and from a meat-supporting plate on which the slice of meat to be tendered rests, said knives making cuts through or nearly through the slice. In some devices of this type, the bank of cutting knives is given its movement toward and from the meat-supporting place through the medium of an operating lever.

One of the objects of the present invention is to provide an improved meat-tendering device of this type in which the meat-supporting place is in the nature of a turntable and in which means are provided for turning the turntable automatically each time that the bank of knives is raised from the meat-supporting plate. This provides for making the cuts in the meat in different directions, thereby more completely tendering the meat than if the cuts were only made in one direction.

Other features of the invention relate to an improved stripper for stripping the meat from the knives when the latter are raised, and improved means for controlling the movement of the stripper.

Still other features of the invention relate to various improvements which will be more fully hereinafter set forth.

In the drawings:

Fig. 7 is a longitudinal sectional view of a modified form of a meat-tendering apparatus in which the turntable is given a selectively intermittent movement until the quarter turn is reached;

Fig. 8 is a sectional view on the line 8—8, Fig. 7, showing the turntable rotating parts in one position;

Fig. 9 is a similar view showing the turntable rotating parts in another position;

Fig. 10 is a longitudinal section of another modification in which the turntable is intermittently rotated in the same direction, and Fig. 11 is a sectional view on the line 11—11, Fig. 10.

Figure 1:
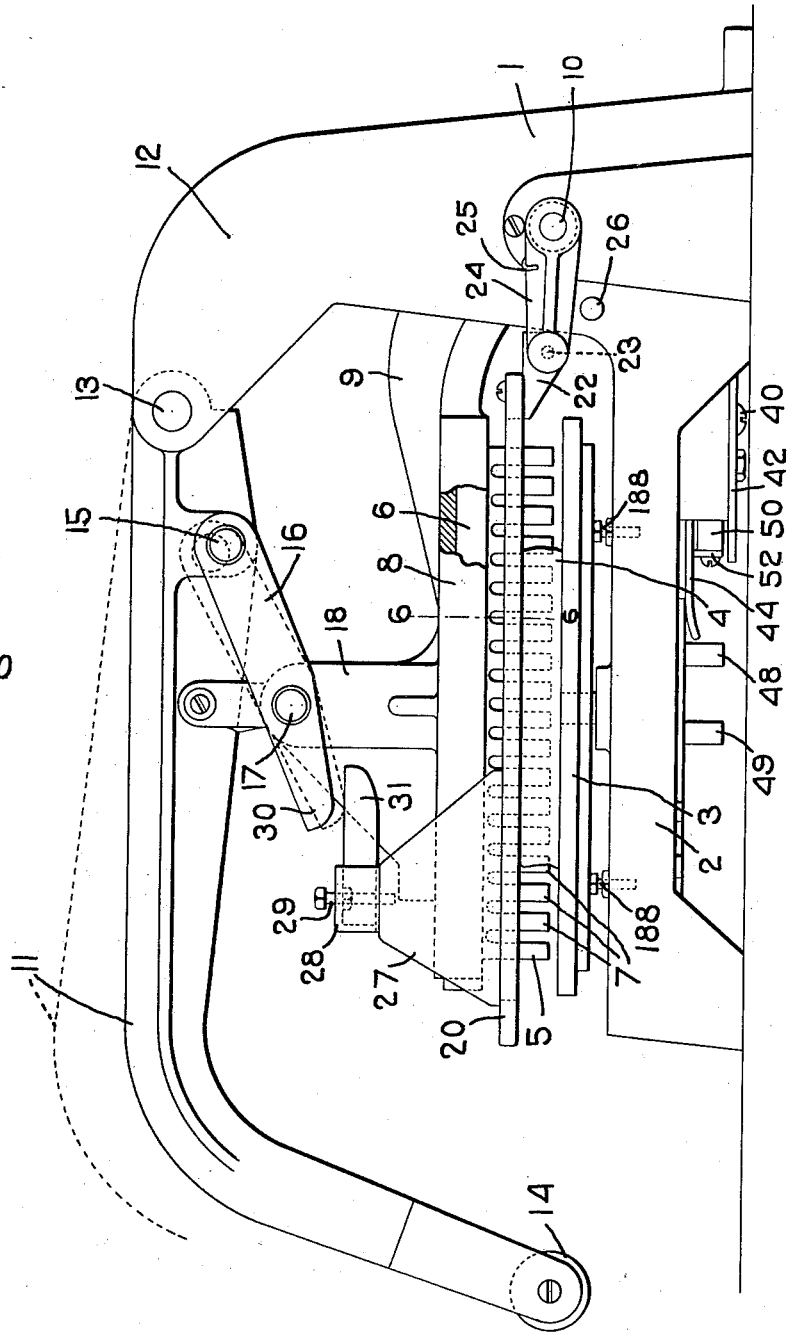
Fig. 1 is a side view of a meat-tendering apparatus embodying my invention.

The device herein illustrated comprises a frame 1 having a bed portion 2 which supports a turntable 3 on which the slice 4 of meat to be tendered is supported, said turntable being shown as resting on leveling screws 188 which are mounted in the bed portion 2. The bank of knives by which the meat is tendered is indicated generally at 5 and this comprises a knife block 6 having a plurality of rows of short blades 7 depending therefrom. Said knife block is removably sustained in a knifehead 8. The knifehead 8 is pivotally mounted to swing toward and from the meat-supporting plate 3 and for this purpose it is shown as carried by an arm 9 having a sleeve 36 rigid therewith, which sleeve is pivotally mounted on a rocker shaft 10 that is supported in the frame 1. The knifehead in this construction can swing from its raised or open position shown in Fig. 5, downwardly into its lowered position shown in Figs. 1 and 3, in which the knives 7 have been forced into and through or partially through the slice 4 of meat, and can also be raised again into the open position.

For giving the knifehead its swinging movement, there is provided an operating lever or arm 11 which is pivoted to the portion 12 of the frame as shown at 13. This lever is provided at its outer end with a handle grip 14 by which it may be manipulated, and it has pivoted thereto at 15 a link 16 which in return is pivoted at 17 to a post or projection 18 rising from the upper face of the knifehead 8. When the lever 11 is swung backwardly from the position shown in Fig. 1, to that shown in Fig. 5, the knife block 6 will be swung upwardly about its pivotal axis, and a swinging movement of the operating lever 11 from the position shown in Fig. 5 to that shown in Fig. 1 will swing the knifehead downwardly into its operative position.

The link 16 and the portion of the lever 11 between its pivotal point 13 and its pivotal connection 15 with the link constitute a toggle device which becomes straightened as the knifehead 8 moves downwardly into its lowest position. The use of this toggle device is advantageous as it is most effective in transmitting power at the time when the knives are cutting through the meat and, therefore, the power applied to the outer end of the lever 11 is used most effectively during the meat-cutting operation.

19 is a buffer block which forms a stop to limit the downward movement of the handle when the toggle device is fully straightened.

20 indicates a stripper member which is associated with the bank of knives and which serves to strip the meat therefrom when the knives are raised in case the meat should stick to the knives. This stripper member is mounted so that it will rest freely on the upper face of the slice 4 while the knives are acting on the meat and will thus accommodate itself to any variation in thickness in the slice, but the operation of raising the knifehead into the position shown in Fig. 5 moves the stripper away from the knifehead and forces the slice of meat off from the knives in case said slice should happen to stick thereto.

The stripper is in the usual form of a grid having slots through which the knives 7 project and at its inner end 21 at each side it is provided with a bracket 22 which is pivotally connected at 23 to an arm 24 that is rigid with the rocker shaft 10. Each arm is acted upon by a spring 25 which tends to swing the arms downwardly. The shaft 10 and the arms 24 thus constitute a rocker member on which the stripper is pivotally mounted. 26 is a stop pin carried by the frame and adapted to be engaged by one of the arms to limit the spring pressed downward movement thereof.

The pivots 23 of the stripper 20 are thus in the nature of floating pivots.

The stripper 20 has two cheek pieces 27 rising therefrom, one on each side thereof, and these cheek pieces are connected by a crossbar 28. 29 indicates stop screws which are threaded through the crossbar and are adapted to be engaged by the upper face of the knifehead 8 when the latter is raised.

Figure 3:
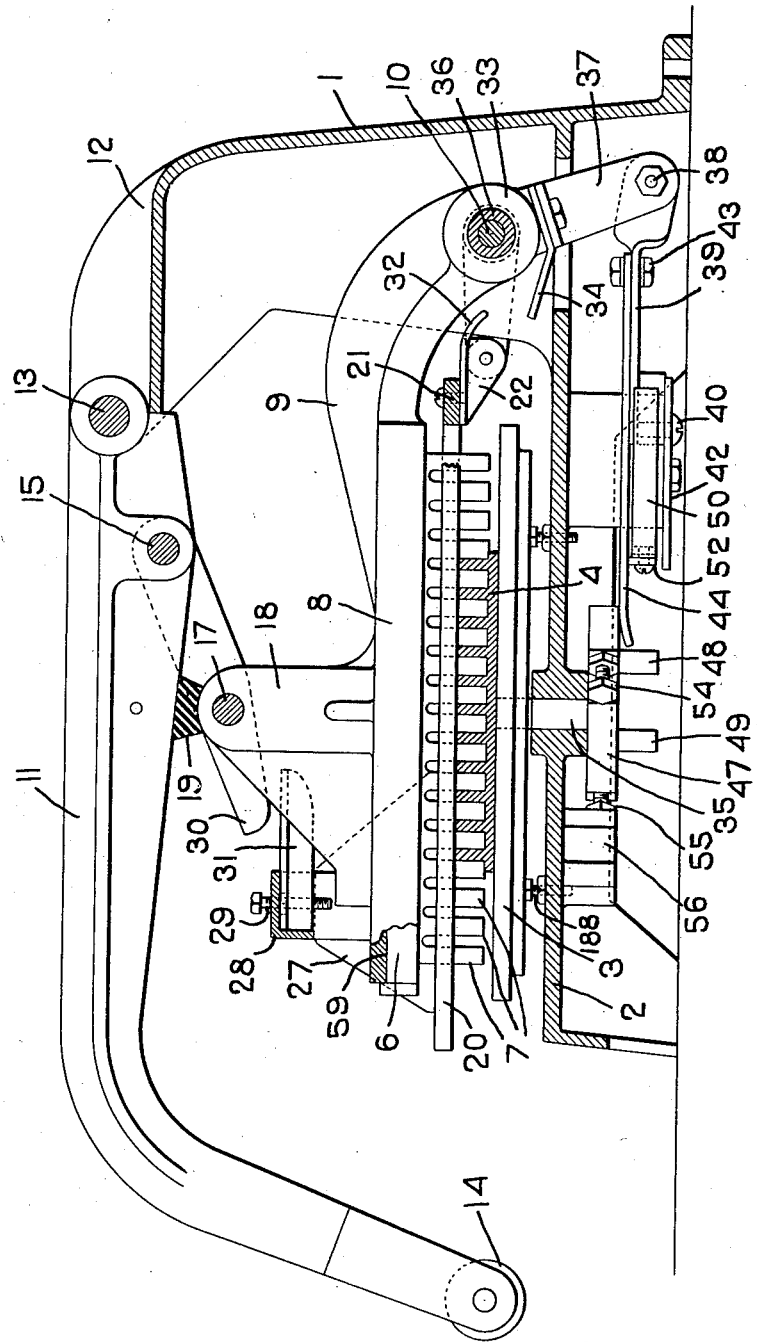
Fig. 3 is a section on the line 3—3, Fig. 2.

When the parts are in the position shown in Figs. 1 and 3, with the stripper 20 resting on the slice 4 of meat and with the knives 7 in their lowered position, the stop screws 29 will be separated from the upper face of the knifehead 8 as shown best in Figs. 1 and 3.

While ordinarily the weight of the stripper 20 may be sufficient to force the meat off from the knives when the latter are raised, yet it may happen that there will be sufficient adherence between the knives and the slice 4 so that the latter will tend to rise with the knives when the latter are moved into their upward position.

There is provided herein means for positively moving the stripper downwardly relative to the knives as the latter are being raised so as to strip the meat from the knives in case it should stick thereto as above suggested. For this purpose, the link 16 is extended as shown at 30 and this extended end is adapted to engage a finger 31 that is rigid with and extends rearwardly from the crossbar 28. The upward swinging movement of the handle 11 turns the link 16 and its extension 30 counterclockwise in Fig. 1 and as soon as the handle 11 has been raised to the dotted line position, Fig. 1, the lower end 30 of the link 16 comes into contact with the finger 31 so that during continued upward movement of the handle, the engagement of the extension 30 of the link with the finger 31 will force the stripper plate downwardly relative to the rising knifehead thereby positively stripping the meat from the knives in case it should stick thereto. The downward or stripping movement of the stripper is limited by the stop screws 29, for, by the time that the stripper has moved downwardly relative to the knives to a point where the under face of the stripper is slightly below the lower edges of the knives, the stop screws 29 will have been brought into engagement with the upper face of the knifehead, and thereafter the stripper is moved upwardly with the knifehead during its continued movement into the position shown in Fig. 5.

During the first portion of the upward movement of the stripper it swings about its pivot 23 while the knifehead is swinging about its pivatol axis 10, but means are provided whereby when the handle 11 and knifehead 8 have been raised into the dotted line position, Fig. 3, the stripper 20 will swing about the same axis as that of the knifehead. For this purpose the rear end 21 of the stripper is provided with a rearwardly projecting lip or flange 32 and the hub 33 of the arm 9 is provided with a forwardly projecting lifting finger or flange 34. The lifting finger 34, being rigid with the arm 9, partakes of its swinging movement about its pivotal axis 10 and when the handle 11 and the knifehead 8 have been given an initial upward movement, the lifting finger 34 will have been brought into engagement with the lip 32, and during further backward swinging movement of the handle 11 and upward swinging movement of the head 8, the rear end 21 of the stripper will be moved upwardly thereby swinging the arms 24 upwardly about the axis 10 and hence during the latter part of the upward movement of the knifehead 8, it and the stripper are swinging about the same axis and there will be no binding or cramping of the parts as would occur if the entire movement of the head 8 and stripper 20 were about different axes.

Figure 5:
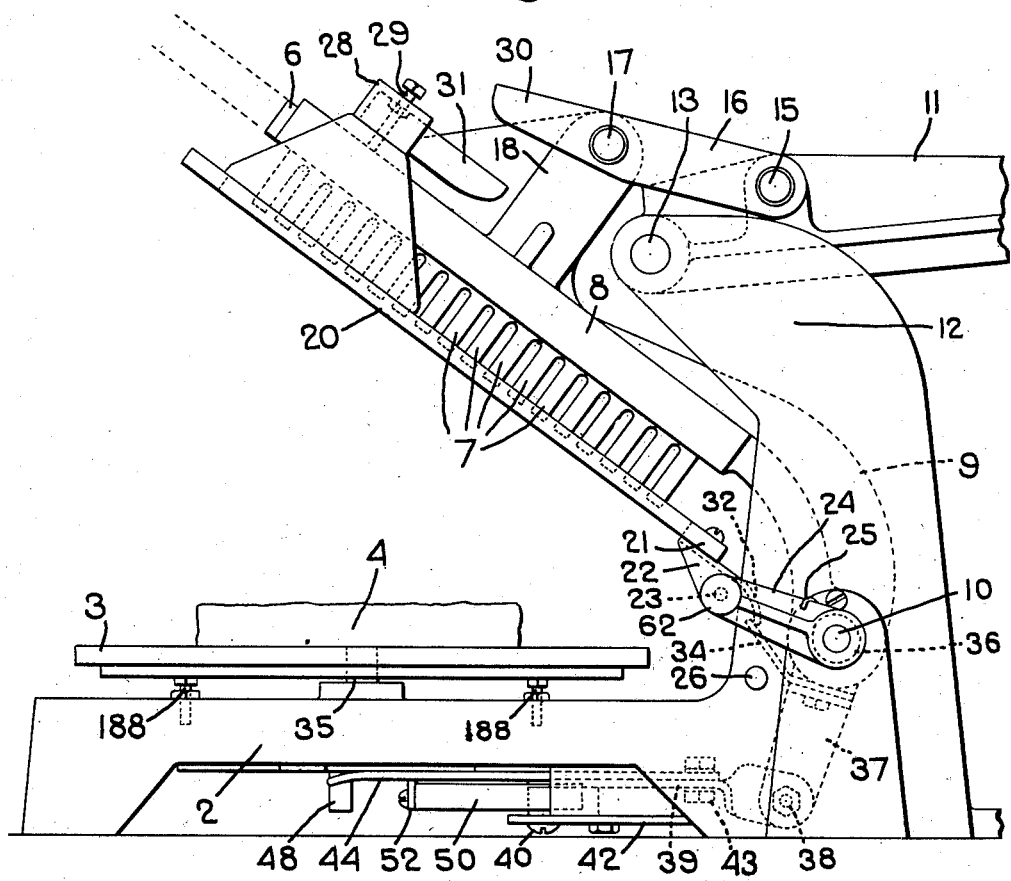
Fig. 5 is a side view showing the knives in raised position.
Figure 6:
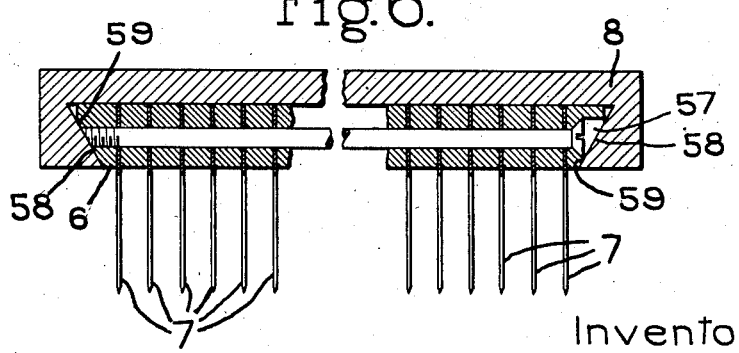
Fig. 6 is a section through the knifehead on the line 6—6, Fig. 1.

When the knifehead 8 is in its raised position, the stripper has the relation thereto shown in Fig. 5. During the first part of the lowering movement of the knifehead onto a slice 4 of meat, said knifehead and stripper will move as a unit. During the latter part of the downward movement, however, the stripper is free to turn about its own pivot 23, which then becomes a floating pivot, and said stripper will automatically find its position on the steak 4 and accommodate itself to the top surface of the steak if one end thereof should happen to be thicker than the other.

It has been stated that the meat supporting plate 3 is in the nature of a turntable. Said plate has a spindle 35 depending therefrom and journaled in the bed 2 of the frame. Suitable means are provided which are operative during the upward movement of the knifehead 8 to act on the spindle 35 and give the turntable 3 a quarter revolution.

The sleeve 36 which is rigid with the arm 9 has a second arm 37 extending downwardly therefrom and rigid therewith. This arm is pivotally connected at its lower end as shown at 38 to a slide 39 which is provided at its forward end with a stud 40 that is received and plays back and forth in a slot 41 in a plate 42 that is secured to the under side of the bed. Pivotally mounted at 43 to the slide 39 is a relatively wide pusher finger 44 having a re-entrant outer end providing two cam faces 45, 46.

The lower end of the spindle 35 has a block 47 fixed thereon provided with two depending pins 48, 49. The pusher finger 44 is yieldingly held in its central position shown in Fig. 4 by means of two spring fingers 50, 51, which are rigid at one end with the pusher finger 44 as shown at 52, and the free ends 53 of which rest against opposite sides of the slide 39.

With this construction, the slide and pusher finger will be given a forward movement each time that the knifehead 8 is raised. With the parts in the position shown in Fig. 4, the initial forward movement will bring the cam face 45 into contact with the pin 48 and during further forward movement of the slide 39 and pusher finger 44, the block 47 and spindle 35 will be turned into the dotted line position Fig. 4 thereby giving the turntable a quarter revolution. The pivotal connection between the pusher finger 44 and the slide 39 provides for the necessary swinging movement of the pusher finger due to the arcuate movement of the pin 48.

When the block 47 has been swung into the dotted line position then the pin 49 will be brought into position to be engaged by the cam face 46 when the pusher finger makes its next forward movement, with the result that, during such next forward movement, the block 47 will be returned to its full line position, thereby giving the turntable a reverse turning movement through a quarter revolution.

Figure 4:
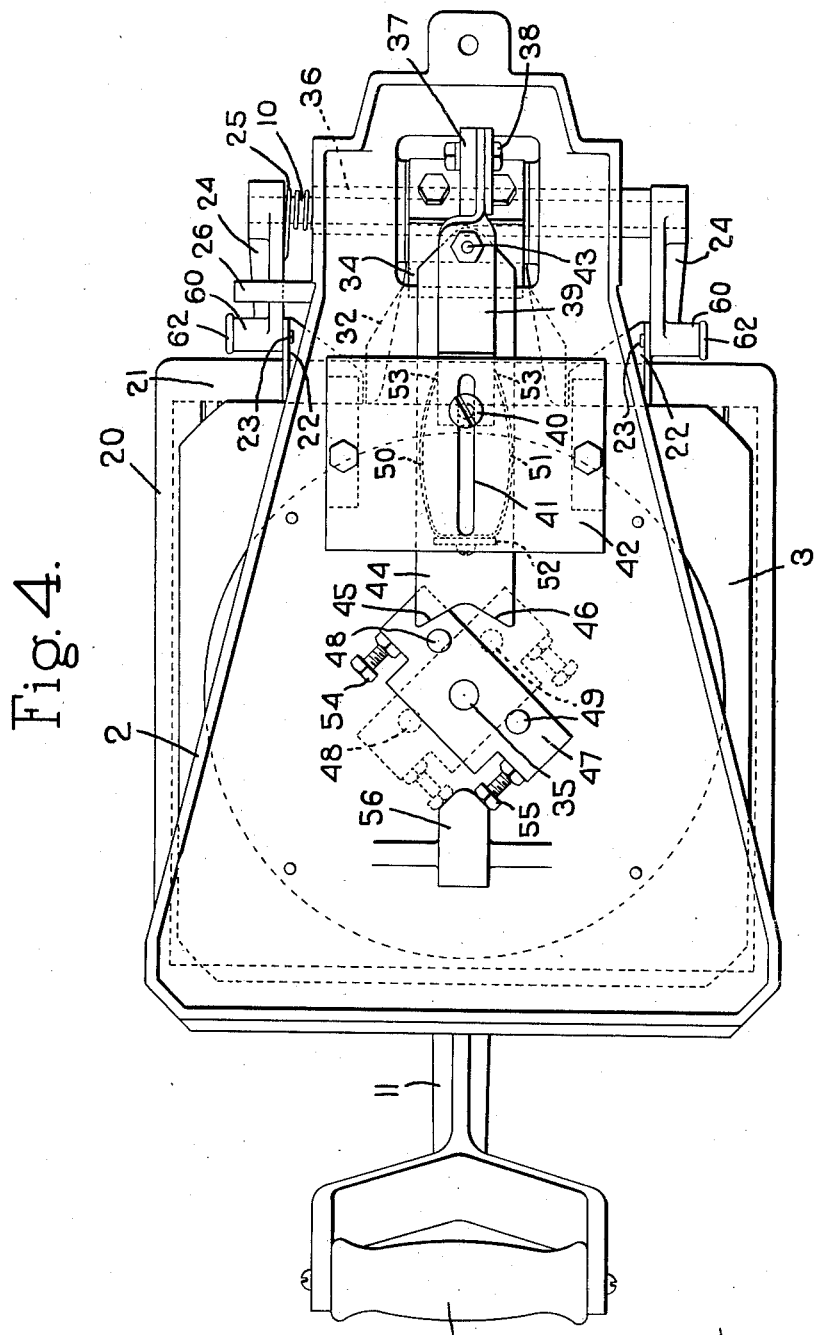
Fig. 4 is an underside view showing the means for turning the turntable.

The block 47 carries two stop screws 54, 55, one of which is adapted to engage a stop projection 56 depending from the under side of the bed when the block 47 is in either of the two positions shown in Fig. 4. In either one of these positions, one of the pins 48 or 49 will be situated to be engaged by one of the cam faces 45 or 46, so that at each forward movement of the slide and the pusher finger the block 47 will be given a quarter revolution.

The knife block 6 with the knives 7 is removably mounted in the knifehead 8 so that the knives can be readily taken out of the knifehead when it is necessary to clean them or sharpen them. The head 8 is formed on its under side with a recess 57 in which the knife block 6 is received. The side walls 58 of said recess are inclined as shown, and the edge walls 59 of the knife block 6 also are inclined to fit the faces 58. This recess is open at the front end and the knifeblock 6 is shown as projecting slightly through the open end of the recess. The knife block 6 can be readily removed from the head by withdrawing it therefrom through the open end of the recess.

Figure 2:
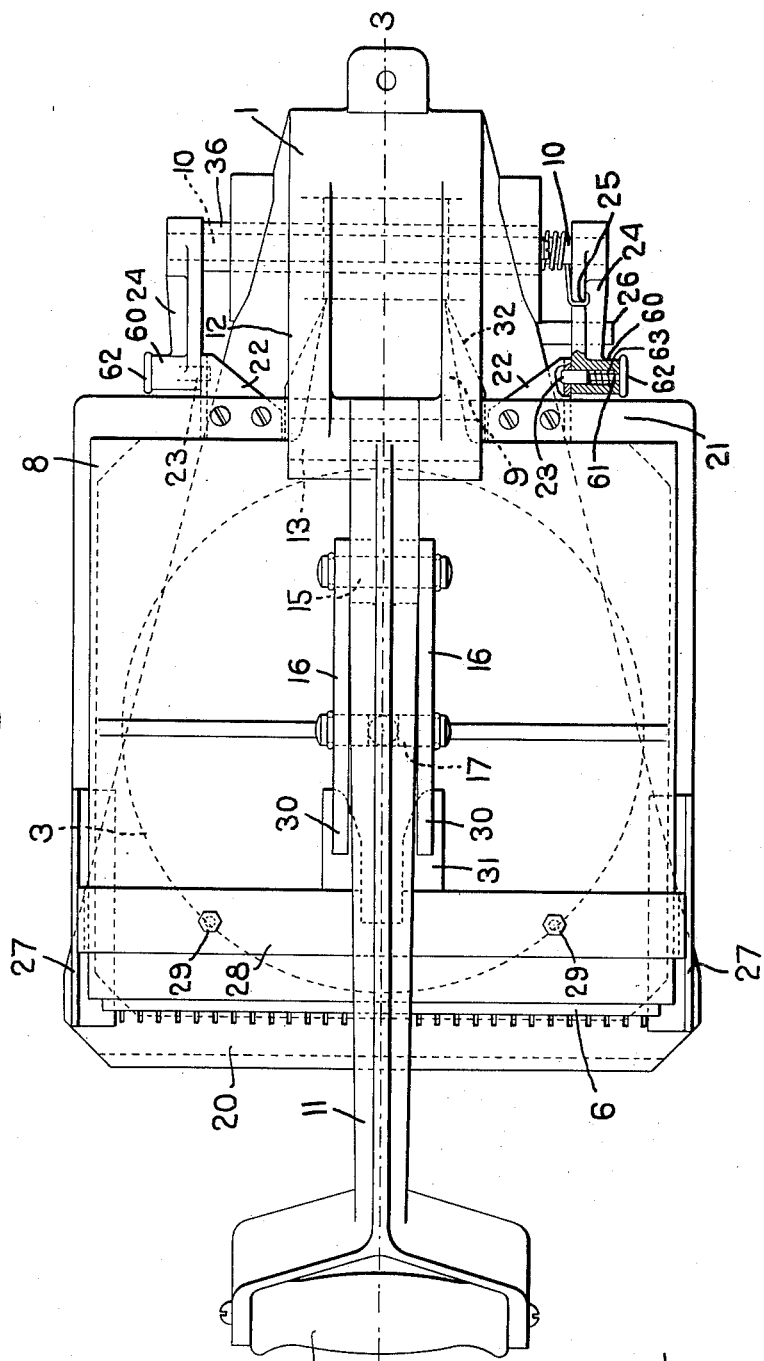
Fig. 2 is a top plan view.

The stripper plate 20 is also removable from the device and for this purpose the pivot pins 23 are so mounted in the arms 24 that they can be withdrawn from engagement with the brackets 22. This is shown best in Fig. 2 wherein each arm 24 is provided at its outer end with a boss 60 in which the pin 23 is mounted. Said pin is formed with a stem 61 and with a head 62 at its outer end on the outside of the boss 60. 63 is a spring acting on the pin and tending normally to urge it forwardly into its operative position.

By grasping the heads 62 of each pin, said pins may be withdrawn from engagement with the bracket 22, thus freeing the stripper so that it can be removed from the machine.

Since the blades 7 extend through the stripper, it is necessary to remove the stripper from the machine simultaneously with the knife block.

The construction above described is such that at each operation of the handle 11, the turntable will be given a rotative movement through 90°, so that the knife cuts in the meat which are made on two successive operations of the handle 11 will be at right angles to each other.

Under some circumstances it may be desirable to make a plurality of cuts in the meat while the turntable is being turned through its 90° movement, and in Figs. 7 to 11 I have shown constructions designed for this purpose. In the device shown in Fig. 7, the turntable 3, its spindle 35 and the block 47 at the lower end of the spindle provided with two pins 48, 49, are the same as shown in Figs. 1 to 6. In said Fig. 7 also a portion of the arm 9 for the knife supporting head 8 is shown and also the depending arm 37 which is connected to the slide 39a, the latter having pivoted thereto at 43 the pusher finger 44 which cooperates with the pins 48 and 49 to turn the turntable 3. The pusher finger 44 is acted on by the springs 50 and 51 as shown in Fig. 4, said springs normally holding said pusher finger in its central position.

The construction shown in Figs. 7 to 9 is such that if the lever 11 is only partially raised so as to give the turntable a turning movement less than 90°, and then said lever is depressed to cause the knives to cut the meat, and subsequently the lever is again given a further raising movement, the pusher finger 44 will act on the same pin 48 or 49 during each successive lifting movement of the lever 11 until the turntable has been given a full quarter revolution. Upon further lifting movements of the lever, the pusher finger will then act on the other pin 48 or 49 thereby to give the turntable either a partial or complete turning movement in the reverse direction.

99 indicates a control member in the form of a plate which is pivotally mounted on the bed of the frame as indicated at 98. Said control member is acted on by a centering spring 97 which normally tends to hold it in its centered position illustrated in Fig. 8. The block 47a which carries the pins 48, 49, is formed with the extension 96 and with the concavely curved edge portions 95 either side of the extension 96. The control member 99 is formed with a nose 94.

When the turntable 3 and its block 47a are in one extreme position shown in Fig. 8, the nose 94 of the control member 99, which is then in its centered position, will stand adjacent one of the curved edges 95. The control member 99 is formed with two depending pins 93, 92, which are situated one on each side of the pusher finger 44. With the parts in this position, the raising of the handle lever 11 will cause the pusher finger 44 to engage the pin 48 thereby to give turning movement to the turntable, and if the lever 11 is given a partial upward movement only sufficient, however, to turn the block 47a into the position shown in Fig. 9, the consequent lateral swinging movement of the pusher finger will bring one edge thereof against the pin 93 depending from the control member 99 and will give said control member a turning movement about its pivot into the position shown in said Fig. 9. If, now, the handle lever 11 is lowered from its partially raised position, the pusher finger will be withdrawn as shown by dotted lines, Fig. 9, and the spring 97 will tend to return the control member 99 to its centered position but the return of this control member will be prevented by the engagement of the nose 94 with the extension 96 of the block 47a so that the control member will be retained in the dotted line position Fig. 9, and in this position the engagement of the finger 92 of the control member with the edge of the pusher finger 44 will prevent said pusher finger from returning to its central position and will maintain the pusher finger in an angular relation so that when the lever is raised again and the pusher finger is again moved forward, it will engage the same pin 48 and thus continue the rotative movement of the turntable in the same direction. When the turntable has been given its full 90° movement, then the extension 96 of the block 47a will have been moved sufficiently to one side to free the nose of the control member so that it can return to its central position, thus allowing the pusher finger 44 to return also to its central position as shown in Fig. 8.

This device thus insures that if the handle 11 is given repeated partial raising movements, the turntable will be stepped forward always in the same direction until it has made its complete quarter revolution, thus preventing any reversal of movement of the turntable during the time that it is being intermittently moved through its quarter revolution.

In Figs. 10 and 11 I have shown another embodiment of the invention wherein the turntable is stepped forward continuously in the same direction, it being given a forward step each time that the handle 11 is raised. In this construction, the turntable is indicated at 3b and it is mounted upon a stud or shaft 35b which is journaled in the bed 2 of the frame. This stud 35b has a ratchet wheel 91 fast on its lower end and the ratchet wheel cooperates with a spring pressed pawl 90 which is pivotally mounted on an arm 89, which in turn is pivotally mounted on the lower end of the stud 35b. 88 is a spring acting against the pawl and holding it yieldingly in its operative position.

The arm 89 is connected by a link 87 with the depending arm 37 so that each time the handle lever 11 is raised to lift the knifehead away from the turntable said link 87 will be moved forward, thus swinging the arm 89 about the stud 35.

86 is a stationary shield which covers some of the teeth of the ratchet wheel 91 as best seen in Fig. 11.

When the link 87 is moved to the left, Fig. 11, the spring pressed pawl 90 will be carried off from the end of the shield 86 and will then engage a tooth of the ratchet wheel 91 and during a further continued movement of the link 87, the ratchet wheel 91, its shaft 35b and the turntable 3b will be given a turning movement. The extent of the turning movement will depend upon the extent to which the lever 11 is raised. If said lever is swung into its fully retracted position as shown in Fig. 5, the turntable 3b will be given a quarter revolution, but by partially raising the lever 11, the turntable will be given a turning movement less than 90°.

With either of the devices shown in Figs. 7 to 11, it is possible to make a series of cuts in the meat while the turntable is being given its quarter revolution, and thus the meat may be repeatedly slit, and the turntable may be given a short forward step after each slitting operation.

In the construction shown in Fig. 10, the turntable 3b is shown as having an upstanding curb 83 at its periphery. The purpose of this curb is to retain any juices which may flow out of the meat or other articles while they are being acted on by the knives.

I claim:

1. A meat-tendering machine comprising a frame having a supporting bed, a meat-supporting turntable rotatively mounted on the bed, a knife-carrying member supported by the frame and movable toward and from the turntable, a plurality of knives carried by the knife-carrying member, means to give the knife-carrying member its movement toward and from the turntable, and means actuated by successive movements of said knife-carrying member away from the turntable to give turning movement thereto first in one direction and then in the other direction.

2. A meat-tendering machine comprising a frame having a supporting bed, a meat-supporting turntable rotatively mounted on the bed, a knife-carrying member supported by the frame and movable toward and from the turntable, a plurality of knives carried by the knife-carrying member, means to give the knife-carrying member its movement toward and from the turntable, and means connected to said knife-carrying member and deriving its movement therefrom to give turning movement to the turntable in one direction during alternate movements of the knife-carrying member away from the turntable and in the other direction during the other movements of the knife-carrying member away from the turntable.

3. A meat-tendering machine comprising a frame, a meat-supporting plate mounted thereon, a knife block, a lever pivoted to the frame and connected to the knife block for moving the latter toward and from the plate, a plurality of knives carried by said knife block, a stripper movable relative to the knife block, and means actuated by the initial block-raising movement of the lever to move the stripper relative to the knives in a direction toward the plate, thereby to strip the meat from the knives.

4. A meat-tendering machine comprising a frame, a meat supporting plate mounted thereon, a knife-carrying member pivoted to the frame, a lever pivotally connected to the frame, a link conecting the lever and knife-carrying member whereby swinging movement of the lever moves the knife-carrying member toward and from the plate, a stripper for stripping meat from the knives, said link having an extension, and means associated with the stripper and cooperating with said extension to give the stripper its meat-stripping movement as the knife-carrying member is raised from the plate.

5. A meat-tendering machine comprising a frame, a meat-supporting plate carried thereby, a knife-carrying member pivoted to the frame, knives carried by said knife-carrying member, a rocker member pivoted to the frame coaxially with the knife-carrying member, a stripper pivoted to the rocker and having a limited swinging movement relative to the knife-carrying member, and means operative during the final upward movement of the knife-carrying member to turn the rocker about its axis in unison with the swinging movement of said knife-carrying member.

6. A meat-tendering machine comprising a frame having a supporting bed, a meat-supporting turntable rotatably mounted on the bed, a knife-carrying member supported by the frame and movable toward and from the turntable, a plurality of knives carried by the knife-carrying member, an operating lever by which the knife-carrying member is given its movement toward and from the turntable, and means actuated by successive partial rising movements of said lever to give the turntable a step-by-step 90° turning movement first in one direction and then in the other.

7. A meat-tendering machine comprising a frame having a supporting bed, a meat-supporting turntable rotatably mounted on the bed, a knife-carrying member supported by the frame and movable toward and from the turntable, a plurality of knives carried by the knife-carrying member, an operating lever by which the knife-carrying member is given its movement toward and from the turntable, and means actuated by successive partial upward movements of said lever to give the turntable a step-by-step turning movement through a predetermined arc first in one direction and then in the other direction.

8. A meat-tendering machine comprising a frame having a supporting bed, a meat-supporting turntable rotatably mounted on the bed, a knife-carrying member supported by the frame and movable toward and from the turntable, a plurality of knives carried by the knife-carrying member, an operating lever by which the knife-carrying member is given its movement toward and from the turntable, and means operated by successive complete upward movements of the lever from its low position to give the turntable a continuous 90° turning movement first in one direction and then in the other direction, said means operating upon successive partial upward movements of the lever from its low position to give the turntable a step-by-step 90° turning movement first in one direction and then in the other.

9. A meat-tendering machine comprising a frame, a meat-supporting plate mounted thereon, a knife block, a lever pivoted to the frame and connected to the knife block for moving the latter toward and from the plate, a plurality of knives carried by said knife block, a stripper movable relative to the knife block, and means connected to the lever and actuated by the initial block-raising movement thereof to move the stripper relative to the knives in a direction towards the plate, thereby to strip the meat from the knives.

10. A meat-tendering machine comprising a frame having a bed, a meat-supporting table mounted on the bed, a knife-carrying member pivotally secured to the frame for movement toward and from the table, said knife-carrying member having a recess in its under face permanently open at the front thereof, a knife block unit having a plurality of knives and means for holding said knives rigidly together in spaced relation, said knife block unit being received in said recess and removable as a unit therefrom through the open front thereof, means to operate the knife-carrying member, a stripper member pivoted to the frame and having slots through which the knives operate, and means normally holding said stripper member in position with the knives occupying said slots, said stripper member being detachably secured to the frame to permit it to be removed with the knife block when the latter is removed from the knife-carrying member.

JOSEPH P. SPANG.